United States Patent [19]
Nilsson

[11] Patent Number: 5,009,855
[45] Date of Patent: Apr. 23, 1991

[54] GAS GENERATOR FOR INFLATING A SAFETY BAG

[75] Inventor: Karl E. Nilsson, Ottobrunn, Fed. Rep. of Germany

[73] Assignee: Bayern-Chemie Gesellschaft fuer flugchemische Antriebe mbH, Aschau, Fed. Rep. of Germany

[21] Appl. No.: 422,649

[22] Filed: Oct. 17, 1989

[30] Foreign Application Priority Data

Oct. 17, 1988 [DE] Fed. Rep. of Germany ....... 3835356

[51] Int. Cl.$^5$ .................... B60R 21/26; B60R 21/32
[52] U.S. Cl. .................................. 422/164; 422/166; 422/193; 422/239; 280/736; 280/741; 280/742; 280/732; 102/275.4; 102/530; 102/276
[58] Field of Search ............... 422/164, 166, 117, 126, 422/192, 193, 305, 238, 239; 280/736, 741, 742, 737, 732; 102/275.4, 530, 276

[56] References Cited

U.S. PATENT DOCUMENTS

| | | | |
|---|---|---|---|
| 3,961,806 | 6/1976 | Katter | 280/732 |
| 3,972,545 | 8/1976 | Kirchoff et al. | 280/741 |
| 4,358,998 | 11/1982 | Schneiter et al. | 280/741 |

FOREIGN PATENT DOCUMENTS 2224201 11/1973 Fed. Rep. of Germany .
2915202 10/1980 Fed. Rep. of Germany .

Primary Examiner—David L. Lacey
Assistant Examiner—Abanti B. Singla
Attorney, Agent, or Firm—W. G. Fasse; D. H. Kane, Jr.

[57] ABSTRACT

A gas generator for inflating a safety bag for the protection of persons in a vehicle, is equipped with a combustion chamber that is divided into a smaller section and into a larger section by a sheet metal insert. The sheet metal insert also divides the fuel into two portions, whereby a smaller fuel portion is located closer to the ignition openings of an ignition device while the larger fuel portion is located further away from the ignition device. The divider or insert provides a passage or gas flow openings which are so located that the combustion gas generated in the smaller section must flow entirely through the smaller section before it enters into the larger section. Thus, the smaller fuel portion is combusted substantially first and the larger fuel portion is combusted thereafter to provide an inflation characteristic for the safety bag such that the bag is initially filled slower and then rapidly.

6 Claims, 1 Drawing Sheet

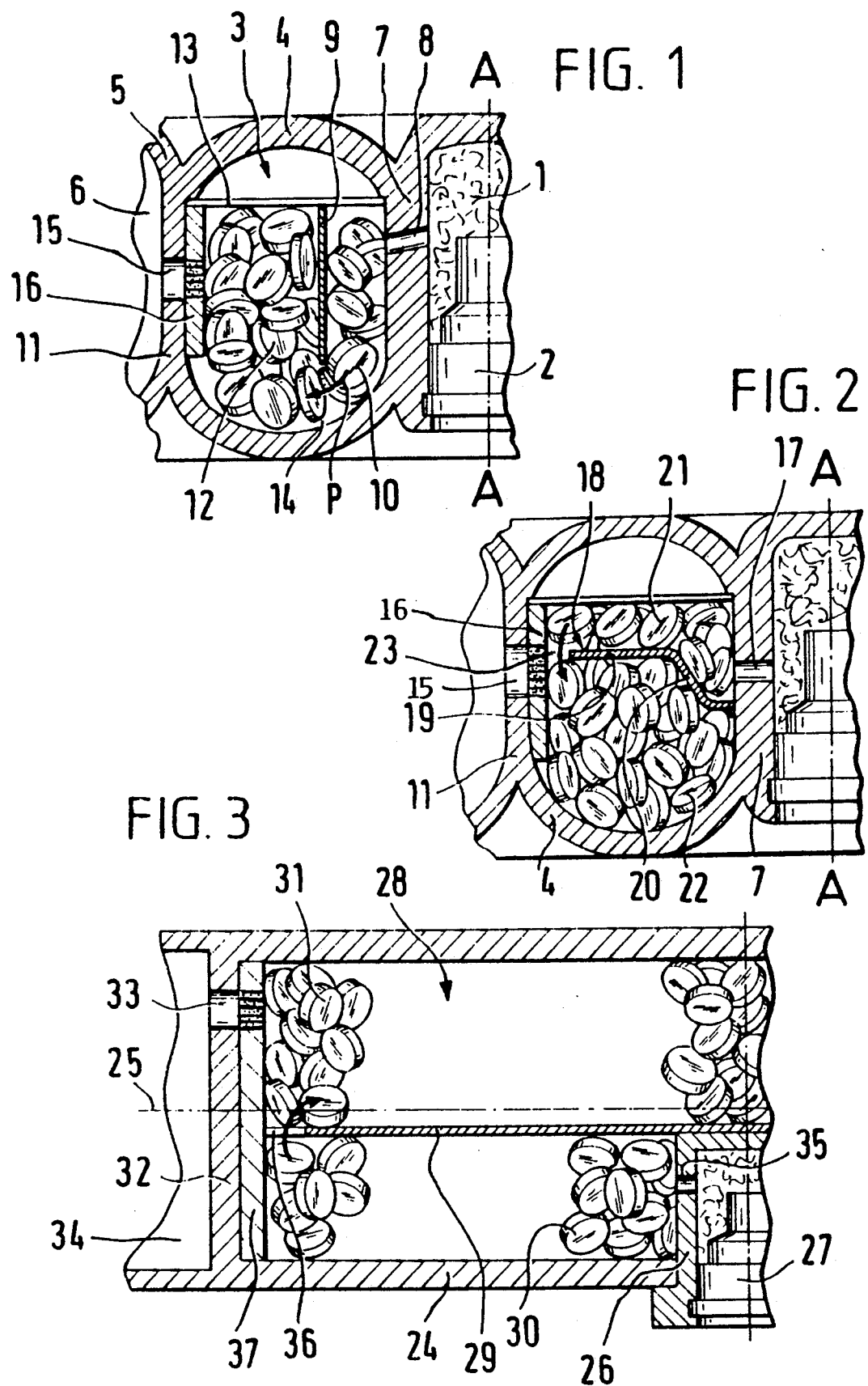

GAS GENERATOR FOR INFLATING A SAFETY BAG

FIELD OF THE INVENTION

The invention relates to a gas generator for inflating a safety bag of the type used in so-called airbag systems which are constructed to protect persons in a vehicle when an impact occurs.

BACKGROUND INFORMATION

In such systems, a gas generator rapidly generates the gas volume required for inflating the safety bag. The fuel is usually a solid fuel in the form of pellets which are ignited through an ignition device connected to a combustion chamber through ignition openings in the combustion chamber wall. The combustion chamber wall is also equipped with gas exit openings located opposite the ignition openings. The generated gas passes through the exit openings from the combustion chamber into a filter chamber which in turn is operatively connected to the interior of the safety bag for its inflation.

Conventional safety bag gas generators have a disadvantage in that injury may occur, especially to persons positioned close to the location of the gas generator which is located directly under or behind the dashboard. A child standing in front of the dashboard rather than sitting on the right-hand front seat, can thus be injured when it is in such an "out-of-position" when the gas generator is ignited. Numerous suggestions have been made to solve this problem, for example, by reducing the inflating speed by increasing the size of the gas generating fuel pellets. However, such an approach undesirably increases the total time needed for inflating the safety bag, thereby generating the danger that the safety bag will not be inflated sufficiently in time to perform its protection function. The safety bag must be fully inflated to be able to perform the protection function and such full inflation must be completed before the passenger or driver is caused to travel in the forward direction at high speed subsequent to an impact. The available time duration depends on the time it takes to crumple the so-called "crusher zone" of a vehicle following the beginning of an impact. Since such time duration is rather short, the reducing of the safety bag inflating speed is not a proper solution to the above mentioned problem.

Furthermore, a certain time duration of about 15 ms is needed following an impact to enable the sensors to evaluate whether the situation involved calls for the triggering of the inflation of the safety bag. The safety bag is not to be inflated in situations which do not constitute a critical impact. Thus, this time duration of about 15 ms further reduces the time available for inflating the safety bag. Thus, different requirements which oppose each other must be satisfied. On the one hand, during a first time phase following the beginning of an impact, a somewhat slower inflating of the safety bag is desirable for preventing injuries to a person close to the gas generator. On the other hand, a rapid inflating for the full deployment of the safety bag is desirable during a second time phase following an impact.

German Patent Publication (DE-OS) 2,224,201 discloses a gas generator with two combustion chambers filled with fuel for the gas generation. Each combustion chamber is provided with gas exit ports leading to the safety bag. As a result, a portion of the gas produced by the combustion of the fuel in the first combustion chamber is conducted directly into the safety bag, while the remaining portion of the generated inflating gas of the first combustion chamber ignites the fuel in the second combustion chamber in order to then completely inflate the safety bag. By inflating the safety bag in two stages it is intended to reduce the stress or load on the safety bag during its inflation and to also make sure that an excessive noise or noise pressure is not generated to avoid injuring a person's hearing. An inflating noise that would injure a person's hearing must be avoided. German Patent Publication (DE-AS) 2,915,202 discloses a gas generator of rotational symmetry suitable for improvement by the present invention.

OBJECTS OF THE INVENTION

In view of the foregoing it is the aim of the invention to achieve the following objects singly or in combination:

to construct a gas generator for the inflation of a safety bag in such a way that the above mentioned disadvantages are avoided, more specifically, that the danger of injury to persons too close to the gas generator, is avoided;

to construct the combustion chamber so that it is capable of combusting the gas generating fuel in two controlled stages; and to construct the combustion chamber economically, yet adaptable to any particular requirements such as to different types of vehicles, and different installation conditions such as available space.

SUMMARY OF THE INVENTION

A gas generator of the type described above is characterized according to the invention in that its combustion chamber is divided into two sections by a sheet metal insert. The insert divides the fuel into two portions. A first fuel portion is located in the chamber section having the ignition openings. A second fuel portion is located in the chamber section having gas exit openings leading into the filter chamber. The partition insert is provided with a gas passage located away from the ignition opening. The passage or passages provide communication between the first combustion chamber section and the section combustion chamber section so that the combustion gases generated in the first section may enter into the second section for igniting the second fuel portion.

Due to the just described construction of the present combustion chamber, only that portion of the fuel is ignited at the beginning which is located directly near the ignition openings. Thus, the inflating gas is initially generated only by combusting the first fuel portion and passes through the passage in the partition insert into the second section holding the second portion of the fuel. The generated gas then passes out of the second combustion chamber section through the filter chamber into the safety bag.

The gas volume produced by the first fuel portion is so guided that a person, especially a child positioned immediately next to the airbag will be gently pressed into the seat rather than slammed into the seat. Simultaneously the combustion gases produced in the first combustion chamber section will ignite the second portion of the fuel as the combustion gases pass through the second combustion chamber section on their way into the filter chamber. Preferably, the second fuel portion is larger than the first fuel portion, whereby a sudden increase in the quantity of inflation gas becomes available so that the safety bag can now be completely inflated in the shortest possible time to protect a person against injuries.

Important advantages of the invention are seen in that it may be used in conventional gas generators that have already been produced in large numbers In other words, conventional gas generators may be improved by the subsequent installation of a partition as disclosed herein. Further, the present partition is rather simple so that it can be readily introduced into the current assemblyline production of combustion chambers of this type.

Yet another advantage of the invention is seen in that the initial relatively gentle pressure increase followed by a rapid pressure increase for the complete inflation of the safety bag may be controlled by simple measures, especially by the location of the sheet metal partition insert in the combustion chamber to thereby divide the total fuel into two portions of a desirable quantity ratio. Another possibility of control is the size of the opening in the partition dividing the two fuel portions. Also, the size of the pellets and similar features can be used for the desired control, or rather for obtaining the desired gas generation characteristics. As a result, the present combustion chamber is easily adapted to different types of vehicles and thus to take into account the characteristics of the crusher zone or crumple zone of the respective vehicle type and to also take into account the interior finish of any particular vehicle.

Another advantage of the present gas generator is seen in that it may be used where it is needed and avoided where a conventional gas generator has been satisfactory. Thus, the present gas generator may be installed in front of the right front seat, but not in front of the driver's seat.

BRIEF DESCRIPTION OF THE DRAWINGS

In order that the invention may be clearly understood, it will now be described, by way of example, with reference to the accompanying drawings, wherein:

FIG. 1 is a sectional view through the combustion chamber portion of a gas generator equipped with a partition wall according to the invention;

FIG. 2 is a view similar to that of FIG. 1, but showing a modified partition wall; and FIG. 3 is another embodiment of a combustion chamber equipped with a partition wall according to the invention.

DETAILED DESCRIPTION OF PREFERRED EXAMPLE EMBODIMENTS AND OF THE BEST MODE OF THE INVENTION

FIGS. 1 and 2 illustrate a combustion chamber, which as such is conventional. A ring-shaped combustion chamber 3 surrounds a concentrically arranged ignition device 2 in a central ignition chamber 1 having a central axis A—A. The combustion chamber 3 is enclosed by a torroid shaped housing 4 including a housing section 5 enclosing a filter chamber 6. A wall 7 separates the ignition chamber 1 from the combustion chamber 3. The wall 7 is provided with ignition openings 8 through which the ignition causing medium passes from the ignition chamber 1 into the combustion chamber 3.

According to the invention, a ring-shaped separation insert or wall 9 in the combustion chamber 3 surrounds the ignition chamber 1, whereby the insert 9 divides the combustion chamber 3 into two sections having different volumes. The first radially inner section holds a smaller volume 10 of combustion pellets. The second outer section between the insert 9 and the separation wall 11 between the combustion chamber 3 and the filter chamber 6, holds a larger portion or volume 12 of fuel pellets. By changing the volumes 10 and 12 relative to each other and by changing the pellet size in each volume, it is possible to desirably influence the combustion characteristic.

A cover 13 keeps the fuel pellet portions 10, 12 in place so that they cannot shake when the vehicle travels, for example, over a rough road. According to the invention, the insert 9 may be directly connected to the cover 13 and thus be inserted with the cover 13. For this purpose the pellets would have to be of such a shape that they permit the insertion of the insert 9. The housing 4 is divided along a line to permit the easy filling of the combustion chamber and also the insertion of the cover 13 with the insert 9.

The insert 9 of FIG. 1 is provided at its lower end with openings 14 so that the generated gas can pass through these openings from the inner chamber section into the outer chamber section as indicated by the arrow P. The ignition openings 8 are located axially substantially higher than the openings 14, thereby causing the combustion gas to initially flow axially downwardly in the radially inner chamber to reach the openings 14.

Referring further to FIG. 1, the ring wall 11 separating the combustion chamber 3 from the filter chamber 6 is provided with openings 15 through which the generated inflation gas can pass into the filter chamber. The details of the filter construction 7 are not shown. However, according to the invention a preliminary filter 16 with pores may be inserted in front of the openings 15. The openings 15 are axially displaced slightly downwardly relative to the openings 8 so that the openings 15 are located approximately centrally relative to the ends of the combustion chamber 3. This location of the openings 15 has been found to provide an efficient gas flow from the combustion chamber 3 into the filter chamber 6. The filter chamber 6 retains any hot particles that may still be present in the inflation gas which then flows out of the filter chamber 6 into a safety bag not shown.

In operation, the smaller pellet portion 10 is first ignited through the ignition openings 8 by the igniter device 2. As a result, the safety bag is initially only inflated to such an extent that a person standing immediately in front of the safety bag is gently pressed into the seat. Thereafter, the gas produced by the first combustion step of the pellet portions 10 causes the ignition of the larger pellet portion 12, thereby rapidly generating the sufficient quantity of gas required for the full inflation of the safety bag. As a result, the combustion characteristic has a steep rise following a slower rise and the safety bag is nevertheless completely filled in a relatively short time sufficient to perform its safety function.

As mentioned above, the pellet portions 10 and 12 are easily filled into the combustion chamber 3 and then separated by the insertion and placing of the cover insert combination 13, 9.

FIG. 2 shows an embodiment similar to that of FIG. 1, however with a modified insert 18 having a bowl portion 20 merging into a rim section 19 surrounding the bowl portion. The insert 18 thus extends substantially radially relative to the longitudinal axis A—A.

However in the embodiment of FIG. 2, the full pellet quantity is also divided into two portions 21 and 22 of which the portion 21 is smaller than the portion 22 for the above explained purpose. The ignition openings 17 in FIG. 2 are located somewhat lower than the ignition openings 8 in FIG. 1, as viewed in the axial direction to provide a gas flow that can be directed by the dished configuration 20 of the insert 18, 19, 20. In FIG. 2 the smaller pellet portion 21 is also ignited first through the ignition holes 17 and the gas flowing through radially outer openings 23 as indicated by the arrow, then ignites the second larger pellet portion 22. The openings 23 may actually be a gap all around the outer rim 19 of the insert 18. The insert 18 is easily formed as a stamped element made of sheet metal.

FIG. 3 illustrates an embodiment of a cylindrical gas generator having a tubular housing 24 enclosing a combustion chamber 28 and having a longitudinal central axis 25. A filter chamber 34 is provided at each end of the combustion chamber 28. Only a portion of the left-hand filter chamber 34 is shown. An ignition device 27 is inserted radially into the combustion chamber 28.

Ignition openings 35 connect the ignition device 27 to the combustion chamber 28 which, according to the invention is divided into a larger portion and a smaller portion by an insert 29 extending axially relative to the central axis 25. The insert 29 separates the fuel pellets into a first smaller portion 30 and into a second larger portion 31. A cover or end wall 32 separates the combustion chamber 28 from the filter chamber 34. Gas exit openings 33 connect the filter chamber 34 with the combustion chamber 28. A preliminary filter 37 with pores is inserted in front of the opening 33. The igniter device 27 may be a tubular member reaching radially into the tubular housing 24 of the combustion chamber 28. Openings 36 in the insert 29 permit a gas flow as indicated by the arrow from the smaller section of the combustion chamber into the larger section thereof. The operation is as described above. Specifically, the smaller pellet portion 30 will be ignited first, and thereafter the pellet portion 31 will be ignited to completely fill the safety bag rapidly after a slower initial filling.

Although the invention has been described with reference to specific example embodiments it will be appreciated, that it is intended to cover all modifications and equivalents within the scope of the appended claims.

What I claim is:

1. A gas generator for inflating a safety bag, comprising a combustion chamber, fuel in said combustion chamber, ignition means including at least one ignition opening between said ignition means and said combustion chamber, whereby said combustion chamber communicates with said ignition means through said at least one ignition opening for igniting said fuel, at least one gas exit opening communicating with said combustion chamber for permitting gas generated in said combustion chamber to exit from said combustion chamber, a sheet metal insert in said combustion chamber for separating said combustion chamber into a first smaller combustion chamber section communicating with said at least one ignition opening and a second larger combustion chamber section communicating with said exit opening and with said first combustion chamber section, said sheet metal insert being positioned in said combustion chamber for separating said fuel into two portions for a sequential combustion in said second combustion chamber section after combustion in said first combustion chamber section, said sheet metal insert being further positioned to provide a gas flow passage (14, 23, 36) between said first smaller and said second larger combustion chamber sections, said sheet metal insert being spaced from said at least one ignition opening thus providing a continuous flow communication between said first and second combustion chamber sections, wherein said second combustion chamber section holds a quantity of fuel larger than is held in said first combustion chamber section, wherein said quantity of fuel in said first combustion chamber section is ignited and combusted first and wherein said quantity of fuel in said second combustion chamber section is ignited by combusted gas flowing from said first combustion chamber section into said second combustion chamber section, whereby said sequential combustion is achieved by a single ignition of said ignition means for generating a gentle initial inflating pressure by the combustion of said quantity of fuel in said first combustion chamber section followed by a rapid pressure increase by the combustion of said quantity of fuel in said second combustion chamber section for a complete inflation of said safety bag.

2. The gas generator of claim 1, wherein said fuel comprises solid fuel pellets.

3. The gas generator of claim 1, wherein said sheet metal insert is made of sheet metal.

4. The gas generator of claim 1, further comprising a ring cover (13) for said combustion chamber, said sheet metal insert comprising a sheet metal ring secured to said ring cover, said sheet metal ring extending into said combustion chamber, said passage comprising a ring gap between said sheet metal ring and a wall of said combustion chamber.

5. The gas generator of claim 1, wherein said sheet metal insert has a dished concave configuration with a bowl portion (20) surrounding said at least one ignition opening and a rim portion (19) extending approximately radially away from said bowl portion, said passage comprising a ring gap between said rim portion (19) and a separation wall (11) which is between said combustion chamber and said filter means.

6. The gas generator of claim 1, wherein said combustion chamber comprises a tubular housing having a longitudinal axis, said sheet metal insert extending in parallel to said longitudinal axis, said passage comprising openings in said sheet metal insert for permitting gas flow through said openings.

* * * * *